United States Patent

[11] 3,545,520

| [72] | Inventors | Francesco Siclari<br>Cesano Maderno;<br>Sergio Fulmini, Milan, Italy |
|---|---|---|
| [21] | Appl. No. | 814,771 |
| [22] | Filed | April 9, 1969<br>Division of Ser. No. 497,709, Oct. 19, 1965,<br>now Pat. No. 3,469,618. |
| [45] | Patented | Dec. 8, 1970 |
| [73] | Assignee | Snia Viscosa Societa Nazionale Industria<br>Milan, Italy<br>a company of Italy |
| [32] | Priority | Oct. 30, 1964 |
| [33] | | Italy |
| [31] | | No. 23346/64 |

[54] APPARATUS FOR REMOVING SUBSTANCES AND FRACTIONS FROM POLYMERS
5 Claims, 2 Drawing Figs.

[52] U.S. Cl. .................................................. 159/4
[51] Int. Cl. .................................................. B01d 1/16
[50] Field of Search .................................. 159/4, 411,
48, 4(B), 4(C), 2, 3, 2(E); 202/158, 173, 206

[56] References Cited
UNITED STATES PATENTS

| 1,817,349 | 8/1931 | Clark | 159/48 |
|---|---|---|---|
| 2,146,532 | 2/1939 | Crane et al. | 18/48 |
| 2,747,659 | 5/1956 | Delrvelle | 159/4(B) |
| 3,212,559 | 10/1965 | Williamson | 159/4(A) |
| 3,231,413 | 1/1966 | Berquin | 159/48X |
| 3,296,240 | 1/1967 | MacDonald et al. | 260/93.7 |

FOREIGN PATENTS

| 972,367 | 1/1951 | France | 159/48 |
|---|---|---|---|
| 1,027,314 | 5/1953 | France | 159/411 |

Primary Examiner—Norman Yudkoff
Assistant Examiner—J. Sofer
Attorney—B. Edward Shlesinger ABSTRACT: Apparatus is disclosed for stripping volatile fractions from polyamides and polyesters to increase their viscosity. The liquid polyamide or polyester to be treated is fed into the top of a container at a temperature above the melting point of the material, and the material is passed through a foraminous plate to subdivide it into liquid threads, and then allowed to fall freely in nitrogen, which is counterflowed to the falling material. The falling material separates into droplets to provide the maximum surface exposure of the material to the counterflowing nitrogen. The fallen material is then transferred into a separate zone and agitated therein to increase the exposure to the inert gas.

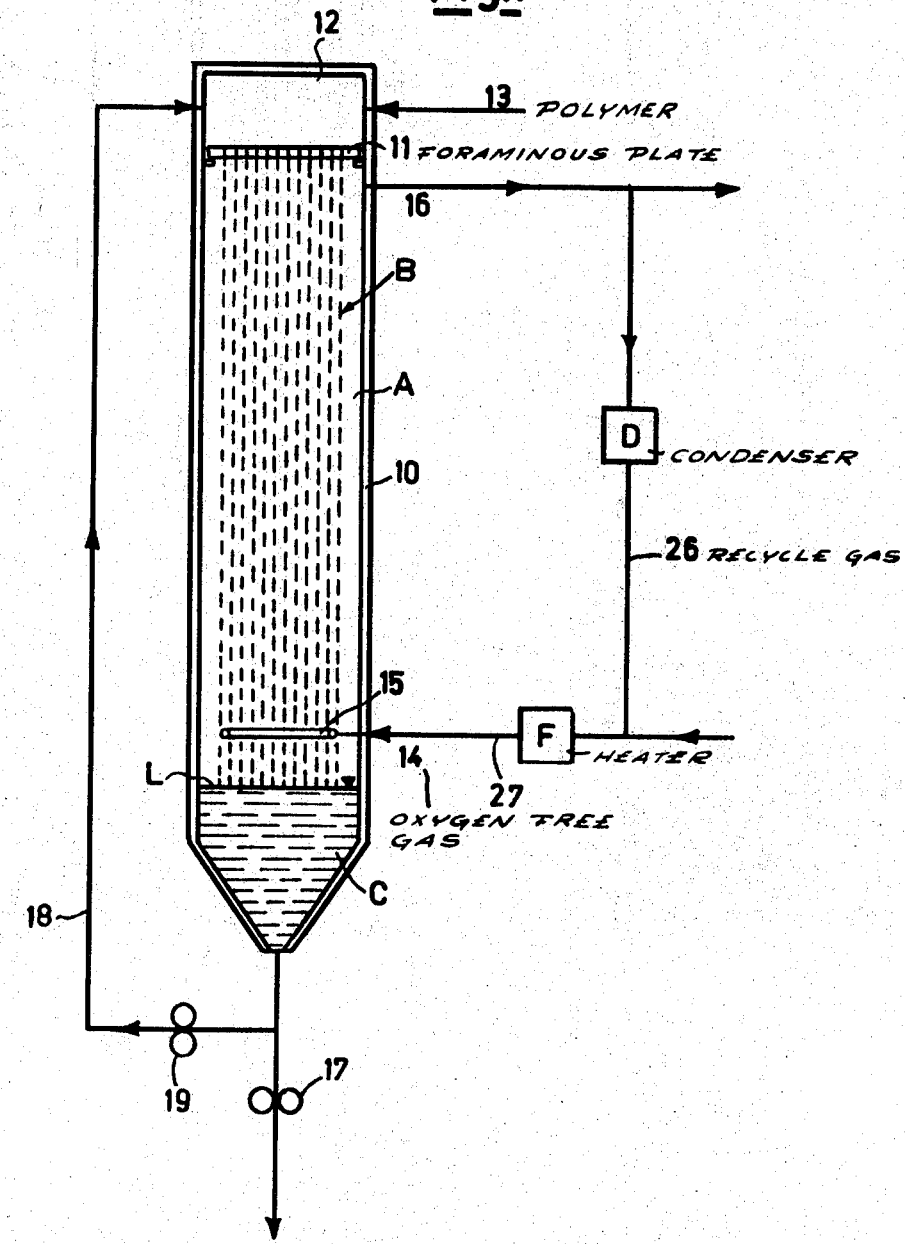

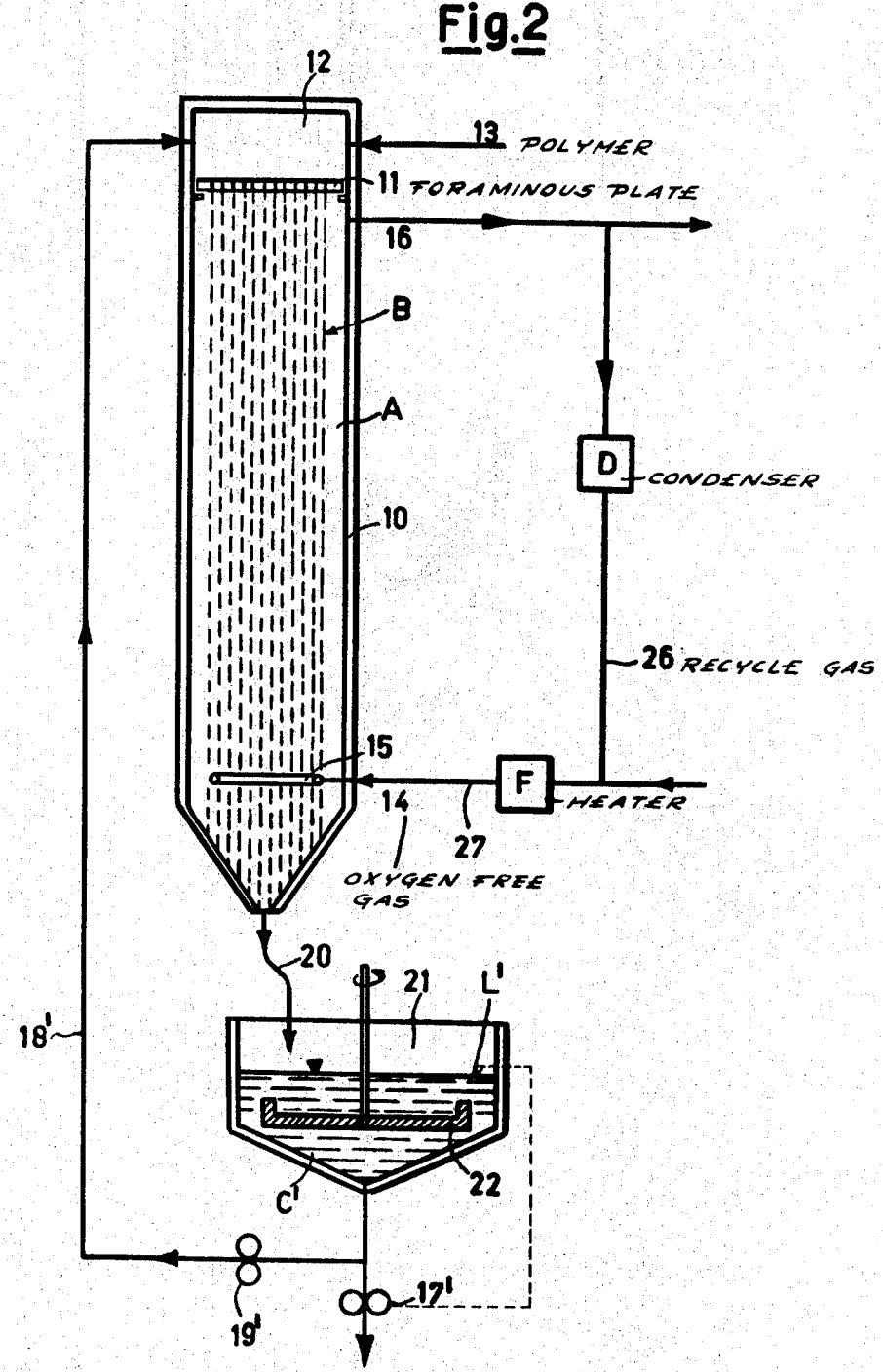

APPARATUS FOR REMOVING SUBSTANCES AND FRACTIONS FROM POLYMERS

This application is a division of our pending application Ser. No. 497,709, filed Oct. 19, 1965, now U.S. Pat. No. 3,469,618.

This invention relates to the industrial technology for the production of synthetic materials in general and, more particularly, to apparatus for removing substances and light fractions from polymers, obtained by polymerization or polycondensation, with an ensuing increase of viscosity.

While polymerization goes on smoothly during initial stages, as the polymer viscosity is increased, the removal of the lightweight fractions left and the inherent increase of viscosity up to the values required for industrial use of the synthesized product prove to be harder and harder to achieve.

Conventional in-vacuo procedures suffer from the drawback that oxidation of the product is likely to occur whenever the vacuum seal of the reactor is not perfect. Moreover, while obtention of vacuum does not exhibit serious difficulties with a batch process, the application of such a technic in a continuous process becomes extremely burdensome, especially because of the need for introduction and removal of materials while attempting to maintain the desired degree of vacuum within the autoclave.

The present invention aims at providing apparatus for performing the lightweight fraction removal stage from polymers under formation, based on the principle of bringing about, at ambient pressure or at a pressure near ambient pressure, physical comminution of the low-viscosity polymer mass, being treated, into a plurality of individual portions having, each, small cross-sectional area, and placing said mass in contact with a conditioned gaseous atmosphere.

For the sake of simplicity, the present invention will be described in the ensuing disclosure with reference to a stripping process on caprolactam derived polymers, i.e. for the preparation of Nylon-6. Be it understood, however, that the invention is in nowise limited to said industrial application, since the application of the inventive ideas can be advantageously resorted to in the production of Nylon-66, of polyesters and of other polycondensates in general and, at any rate, to the production of other polymers which require a final stripping stage to remove the lightweight fractions while concurrently reaching the desired degree of viscosity.

Broadly, the apparatus of this invention comprises a closed container into the top of which the liquid viscous material, which is to be treated, is introduced, a perforated plate through which the material passes and comes out in the divided form of continuous liquid threads having a small cross-sectional area and further divided into droplets. The material falls in the container for a height of at least 20 ins. within a conditioned atmosphere whose composition and temperature is such as to encourage the removal of water and of lightweight fractions from the surface of the material particles.

Said atmosphere is a gaseous inert atmosphere, for example nitrogen, carbon dioxide, dry steam or a gaseous atmosphere in which no oxygen is present, and which is preferably heated at an appropriate temperature to avoid overcooling of the melted polymer. In order that water vapor and the lightweight fractions may be removed from the polymer, the inert gas, such as nitrogen or dry steam, is brought into contact with the polymer which is falling in divided form in that atmosphere, either in downstream or counterflow relationship therewith.

In order to limit the consumption of said inert gas in the apparatus, suitable recycling means therefore is provided, care being taken, of course, suitably to separate the stripped substances from the inert gas before feeding it to the apparatus again.

The material exposed to said atmosphere, when its fall therein is completed, is collected at the bottom of the closed container or in a separate container, for example in an autoclave, in the at rest condition or with stirring in order that the process run may be completed. The polymer will be sent thereafter to the extrusion stage by means of a pump.

A particular description of embodiments of apparatus adapted to put the inventive method into practice will be given hereinafter.

Said apparatus are shown quite diagrammatically, while dispensing with the merely constructional and structural details individually known to those skilled in the art, in the accompanying drawings, wherein:

FIG. 1 is a sectional view of apparatus built according to one embodiment of the invention in which the mass is collected on the bottom of the same container in which the material is caused to fall in divided form; and FIG. 2 shows a preferred embodiment in which said collection stage is performed in a separate autoclave equipped with stirring means.

In the embodiment shown in FIG. 1, the stripping enclosure A is a container 10, e.g. cylindrical, having a vertical axis and a height which is great with respect to its diameter. By means of a transverse foraminous plate 11, a chamber 12 is formed in the top portion of said container, wherein the polymer is introduced through an input 13. The introduction is preferably effected by a metering pump and other means adapted to deliver the material, which is to be treated in the desired amounts as related to time. The material sent to the chamber 12 can be at atmospheric pressure or at higher pressure, consistent with that which is necessary to ensure the falling of the material through the foraminous plate 11.

Said plate has a plurality of orifices having suitable cross-sectional area, corresponding as a rule to a diameter not exceeding 5 mms., but orifices having larger diameters, e.g. of 10 mms. are also adapted to the ends of the invention. Said orifices are intended to assure division of the material into liquid threads which, as they come out of said orifices, and possibly also during their gradually accelerated falling motion, can be further divided into droplets.

The material, which falls in the form of liquid threads or droplets, as diagrammatically shown at B, is in an inert atmosphere formed by a gas continually supplied at 14, for example through a foraminous tubular ring 15. The gas is caused to circulate in counterflow with respect to the falling material B, being removed at 16 to be sent thereafter to conventional devices (not shown) for stripping water vapor and the lightweight fractions removed from the material B, with a view to possibly recovering and recycling the gas.

The inert gas or the vapor can be recycled through a return circuit 26 comprising means for removing the components to be stripped, such as a condenser D and through a circuit 27 for introduction or reintroduction of the gas or vapor into the container A. This latter circuit comprises heating means, such as an oven F, for imparting to said gas or vapor the most appropriate temperature.

The material falling to the bottom of the container 10 is collected as a mass C which is maintained at the proper level by adjustable level gauges L.

The removal of said material from the stripping container can take place, for example, by means of a metering pump 17.

In order that the exposure of said material in divided B form to said atmosphere may be increased, a circuit 18, equipped with a metering pump 19, is provided for recycling and returning said material to the feeding chamber 12.

In the preferred embodiment shown in FIG. 2, wherein parts equivalent to those described above are denoted by the same reference symbols or numerals, the bottom end of the container 10 communicates via a duct 20, with an autoclave 21 fitted with the stirring means 22 and in which the mass C' of the material having traveled through the stripping atmosphere A, is collected to undergo the process completion stage.

The level of the material in said autoclave 21 is volumetrically metered by proportioning the discharge, e.g. by a pump 17' controlled by the level gauges L'. A duct 18' and a pump 19' is further provided to recycle the material from a point downstream of the autoclave 21 to the entrance chamber 12 of the stripping enclosure A, when a still further exposure is desired.

A few examples will now follow of practical application of the inventive method, resulting from experiments performed in an apparatus constructed essentially according to the embodiment of FIG. 2 and having the following constructional and dimensional specifications:

The stripping enclosure A has a height of fall of 40 ins. for the material in its divided form B.

The partition plate 11 has 120 orifices having each a diameter of 2 mms., and spaced from each other by 3 mms., so as to avoid having the falling liquid threads or droplets come into possible mutual contact, thus assuring a free fall and the certainty of dispersion throughout the gaseous atmosphere.

An autoclave 21 has been used, having a capacity of 13 pounds of material and fitted with a two-pronged stirrer 22 rotated at a speed of 10 r.p.m.

The jacketed container 10 is heated by circulating diphenyl in its jacket.

The tests have been performed by carrying out a stripping procedure on Nylon-6 of the kind known in the market as "Lilion" by heating the atmosphere with circulation of diphenyl at 260°C. Obviously the temperature of the atmosphere is chosen consistently with the nature of the polymer to be treated.

The apparatus is fed with polymer at a constant rate of flow of about 2.2 pounds per hour.

The apparatus assures a perfectly controllable production, in that the desired degree of viscosity is definitely a function of the rate of flow of the nitrogen being circulated and can thus be determined beforehand by merely adjusting the feeding means for the inert gas to be circulated.

We claim:

1. Apparatus for stripping substances and lightweight fractions from polymers with consequent increase in viscosity of the polymers, comprising a first processing means including:
   a container having a greater height than diameter;
   said container having an inlet port adjacent its top through which the liquid polymer, which is to be treated, is introduced;
   a foraminous partition disposed adjacent the top of said container but below said inlet port and having orifices therein through which the material flows and by which the material is divided into a plurality of liquid threads or droplets which fall into and through said container;
   means for continuously introducing an inert oxygen free gas into said container, adjacent the bottom thereof and for causing said gas to flow counter to the falling material; and
   a second processing means comprising:
   a vessel;
   a duct connected to the bottom of said container through which the treated fallen material is introduced from said container into said vessel;
   means for agitating the material introduced into said vessel;
   a pump connected to said vessel for volumetrically metering discharge of material from said vessel;
   a level gauge in said vessel controlling the operation of said pump in accordance with the level of material in said vessel; and
   means for also volumetrically recirculating a portion of the material, removed from said vessel by another pump, to the top of said container independently of the inlet port for passage again through said partition and free fall again through said container.

2. Apparatus as claimed in claim 1, having means for also volumetrically recirculating a portion of the material, removed from said vessel by another pump, to the top of said container independently of the inlet port for passage again through said partition and free fall again through said container.

3. Apparatus as claimed in claim 1, having means for recycling the inert atmosphere into said container after having removed therefrom at least a fraction of the lightweight substances and fractions removed from said material.

4. Apparatus as claimed in claim 1 having an exhaust port for removing the gas from said container adjacent the top of said container but below said partition.

5. Apparatus as claimed in claim 4 including means for heating the gas removed from the top of said container, and recirculating it into said container adjacent the bottom thereof.

UNITED STATES PATENT OFFICE
CERTIFICATE OF CORRECTION

Patent No. 3,545,520            Dated     December 8, 1970

Inventor(s) Francesco Siclari et al.

It is certified that error appears in the above-identified patent and that said Letters Patent are hereby corrected as shown below:

On the cover page [73], "Snia Viscosa Societa Nazionale Industria" should read -- Snia Viscosa Societa' Nazionale Industria Applicazioni Viscosa S.p.A. --.

Signed and sealed this 4th day of May 1971.

(SEAL)
Attest:

EDWARD M. FLETCHER, JR.
Attesting Officer

WILLIAM E. SCHUYLER,
Commissioner of Pate